United States Patent [19]

Higuchi et al.

[11] 3,760,804

[45] Sept. 25, 1973

[54] IMPROVED OSMOTIC DISPENSER EMPLOYING MAGNESIUM SULPHATE AND MAGNESIUM CHLORIDE

[75] Inventors: Takeru Higuchi, Lawrence, Kans.,
Harold M. Leeper, Mountain View, Calif.

[73] Assignee: Alza Corporation, Palo Alto, Calif.

[22] Filed: Jan. 13, 1971

[21] Appl. No.: 106,031

[52] U.S. Cl. .............................. 128/260, 222/386
[51] Int. Cl. .................................. A61m 31/00
[58] Field of Search ........................... 210/23;
128/127–131, 172, 213, 252, 260, 261, 271,
272; 222/193, 386, 389, 386.5, 94.95, 97,
105, 106, 130, 389, 386

[56] References Cited
UNITED STATES PATENTS
3,604,417  9/1971  Stolzenberg .................... 128/213

OTHER PUBLICATIONS
Govindan and Sourirajan, "Reverse Osmosis Separation of Some Inorganic Salts.....Membranes," I & EC Process Design and Development, Vol. 5, No. 4, p. 422–429, October 1966.

*Primary Examiner*—Richard A. Gaudet
*Assistant Examiner*—J. C. McGowan
*Attorney*—Steven D. Goldby and Paul L. Sabatine

[57] ABSTRACT

An osmotic dispenser is described which is capable of releasing to its outside environment concentrations of active agent at an osmotically controlled rate over a prolonged period of time, and the motive force of which dispenser depends on the osmotic pressure developed by either (1) an aqueous solution of magnesium sulphate, preferably a saturated aqueous solution, or (2) a saturated aqueous solution of magnesium chloride containing excess magnesium sulphate solute in solid form, against a hypotonic aqueous environment.

7 Claims, 3 Drawing Figures

IMPROVED OSMOTIC DISPENSER EMPLOYING MAGNESIUM SULPHATE AND MAGNESIUM CHLORIDE

CROSS REFERENCE TO RELATED APPLICATIONS

Takeru Higuchi copending application, Ser. No. 106,131 filed Jan. 13, 1971, assigned to the assignee of the present invention;

Takeru Higuchi and Harold M. Leeper copending application, Ser. No. 106,130, filed Jan. 13, 1971, also assigned to the assignee of the present invention;

Harold M. Leeper copending application, Ser. No. 106,132 filed Jan. 13, 1971, also assigned to the assignee of the present invention; and Takeru Higuchi and Harold M. Leeper copending application, Ser. No. 106,161, filed Jan. 13, 1971, also assigned to the assignee of the present invention.

PRIOR ART

Rose and Nelson, Austral. J. exp. Biol., 33 pp. 415 – 420 (1955); Rose and Nelson, Austral. J. exp. Biol., 33 pp. 411 – 414 (1955).

FIELD OF THE INVENTION

This invention relates to an osmotic dispenser, and more especially, to an osmotic dispenser, simple in construction, capable of releasing to its outside environment concentrations of active agent at an osmotically controlled rate over a prolonged period of time.

DEFINITION OF TERMS

The expression "active agent" as used herein denotes any drug (as defined, infra); composition in any way affecting any biological entity; substance having a nutrient or stimulating action, or growth inhibiting, destroying or any regulating action on plant growth, controlled or otherwise; substance to be assimilated by any organism, e.g., human being, animal, or lower order organism, for its nourishment or for regulating its growth; substance exhibiting any of the above activities to be directly applied to the habitat, surroundings or environment of any of the above organisms; and substance having any other effect on any other environment, especially any aqueous environment.

Therefore, suitable active agents for use with the dispenser of this invention include, without limitation, those which are generally capable of:

1. Preventing, alleviating, treating or curing abnormal and pathological conditions of the living body by such means as destroying a parasitic organism or limiting the effect of the disease or abnormality by chemically altering the physiology of the host or parasite;

2. Maintaining, increasing, decreasing, limiting or destroying a physiologic body or plant function, e.g., vitamin compositions, sex sterilants, fertility inhibitors, fertility promoters, growth promoters, and the like;

3. Diagnosing a physiological condition or state;

4. Controlling or protecting an environment or living body by attracting, disabling, inhibiting, killing, modifying, repelling or retarding an animal or microorganism, such as food and non-food baits, attractants and lures, biocides, pesticides, algicides, parasiticides, rodenticides, insecticides, fungicides, and the like;

5. Preserving, disinfecting or sterilizing; and

6. Controlling or affecting generically an environment, as by introducing a catalyst or metering a reactant into a reacting chemical system, or by effecting any chemical process therein, such as a fermentation, including propagation and/or attenuation of a microorganism.

The terms "environment," "surroundings" and "habitat" as used hereinabove and herein denote any prospective situs for the osmotic dispenser of this invention, or at least for the water permeable membrane component thereof, which is comprised of or will provide sufficient water for absorption into the device to develop the needed osmotic pressure on which its motive force depends; and implicit in the foregoing definition of "active agent" - one that will develop its action in the presence of such environment, surroundings or habitat, or one that will develop its action in a remote and/or another environment, which need not be aqueous.

Any of the drugs used to treat the body, both topical and systemic, can be compartmentalized as the active agent in any of the osmotic dispensers of this invention. "Drug" is used herein in its broadest sense as including any composition of substance that will produce a pharmacological or biological response.

Suitable drugs for use in therapy with the dispenser of the invention include without limitation:

1. Protein drugs such as insulin;

2. Desensitizing agents such as ragweed pollen antigens, hay fever pollen antigens, dust antigen and milk antigen;

3. Vaccines such as small pox, yellow fever, distemper, hog cholera, fowl pox, antivenom, scarlet fever, diphtheria toxoid, tetanus toxoid, pigeon pox, whooping cough, influenzae, rabies, mumps, measles, poliomyelitis, Newcastle disease, etc.;

4. Anti-infectives, such as antibiotics, including penicillin, tetracycline, chlortetracycline, bacitracin, nystatin, streptomycin, neomycin, polymyxin, gramicidin, oxytetracycline, chloramphenicol, and erythromycin; sulfonamide, including sulfacetamide, sulfamethizole, sulfamethazine, sulfadiazine, sulfamerazine, and sulfisoxazole; anti-virals including idoxuridine; and other anti-infectives including nitrofurazone and sodium propionate;

5. Anti-allergenics such as antazoline, methapyrilene, chlorpheniramine, pyrilamine and prophenpyridamine;

6. Anti-inflammatories such as hydrocortisone; cortisone, hydrocortisone acetate, dexamethasone, dexamethasone 21-phosphate, fluocinolone, triamcinolone, medrysone, prednisolone, prednisolone 21-phosphate, and prednisolone acetate;

7. Decongestants such as phenylephrine, naphazoline, and tetrahydrozoline;

8. Miotics and anticholinesterases such as pilocarpine, eserine salicylate, carbachol, di-isopropyl fluorophosphate, phospholine iodide, and demecarium bromide;

9. Mydriatics such as atropine sulfate, cyclopentolate, homatropine, scopolamine, tropicamide, eucatropine, and hydroxyamphetamine;

10. epinephrine, such as epinephrine;

11. Sedatives and Hypnotics such as pentobarbital sodium, phenobarbital, secobarbital sodium, codeine, (α-bromoisovaleryl) urea, carbromal;

12. Psychic Energizers such as 3-(2-aminopropyl) indole acetate and 3-(2-aminobutyl) indole acetate;

13. Tranquilizers such as reserpine, chlorpromazine, and thioproprazate;

14. Androgenic steroids such as methyltestosterone and fluoxymesterone;

15. Estrogens such as estrone, 17α-estradiol, ethinyl estradiol, and diethyl stilbesterol;

16. Progestational agents such as progesterone, megestrol, melengestrol, chlormadinone, ethisterone, norethynodrel, 19-nor-progesterone, norethindrone, medroxyprogesterone and 17α-hydroxy-progesterone;

17. Humoral agents such as the prostaglandins, for example, $PGE_1$, $PGE_2$, and $PGF_2$;

18. Antipyretics such as aspirin, sodium salicylate, and salicylamide;

19. Antispasmodics such as atropine, methantheline, papaverine, and methscopolamine bromide;

20. Anti-malarials such as the 4-aminoquinolines, 8-aminoquinolines, chloroquine, and pyrimethamine;

21. Antihistamines such as diphenhydramine, dimenhydrinate; tripelennamine, perphenazine, and carphenazine;

22. Cardioactive agents such as hydrochlorothiazide, flumethiazide, chlorothiazide, and trolnitrate;

23. Nutritional agents such as vitamins, essential amino acids and essential fats;

24. Anti-Parkinsonism agents such as L-dopa, (L-3,4-dihydroxyphenylalanine);

25. Investigative antihypotensive agents such as dopamine, 4-(2-aminoethyl) pyrocatechol.

Other drugs having the same or different physiological activity as those recited above can be employed in osmotic dispensers within the scope of the present invention. Suitable mixtures of drugs can, of course, be dispensed with equal facility as with single component systems.

Drugs can be in various forms, such as uncharged molecules, components of molecular complexes, or non-irritating pharmacologically acceptable salts such as hydrochloride, hydrobromide, sulphate, phosphate, nitrate, borate, acetate, maleate, tartrate, salicylate, etc. For acidic drugs, salts or metals, amines, or organic cations (e.g., quaternary ammonium) can be employed. Furthermore, simple derivatives of the drugs (such as ethers, esters, amide, etc.) which have desirable retention and release characteristics but which are easily hydrolyzed by body pH, enzymes, etc., can be employed.

The amount of drug incorporated in the osmotic dispenser varies widely depending on the particular drug, the desired therapeutic effect, and the time span for which it takes the drug to be released. Since a variety of dispensers in a variety of sizes and shapes are intended to provide complete dosate regimes for therapy for a variety of maladies, there is no critical upper limit on the amount of drug incorporated in the dispenser. The lower limit too will depend on the activity of the drug and the time span of its release from th dispenser. Thus it is not practical to define a range for the therapeutically effective amount of drug to be released by the dispenser.

BACKGROUND OF THE INVENTION

Osmotic dispensers have heretofore been proposed, each of which is capable of dispensing concentrations of active agent at an osmotically controlled rate over a prolonged period of time.

Typically, these osmotic dispensers are comprised of a first compartment of relatively impervious material containing an active agent and a second compartment or chamber of controlled permeability to water containing a solution of an osmotically effective solute which exhibits an osmotic pressure gradient against water. Such devices are so constructed that, when placed in or functionally exposed to (By "functionally exposed to" it is intended that, for example, such devices may be provided with their own self-contained water supply or separate water compartment, as in the first mentioned Rose and Nelson publication, supra.) a hypotonic aqueous environment, water is absorbed therefrom by osmosis and diffuses into the solution contained in the second compartment. As the water flows into the second compartment, the solution contained therein and in certain instances the compartment itself increase in volume, thus generating, either directly or indirectly, mechanical pressure or force on the active agent containing first compartment. The said first compartment is provided with any suitable dispensing head for releasing its active agent content to the exterior of the dispenser and individually is of a construction that its active volume is inversely reponsive to the pressure thus exerted, i.e., is of such construction that, in use, the volume of same diminishes in a direct proportion to and as a consequence of increase in volume in the said second compartment. Hence, the rate and amount of release of the active agent are directly proportional to the change in volume in the second compartment, but inversely proportional to the volume change in the first. That is, as the water flows into the device, the second compartment increases in volume generating corresponding pressure or force on the first, either directly or indirectly, as by transmitting pressure against a separate or common wall member thereof, which wall member is yielding to such pressure, or by biasing a movable barrier into or against the first compartment or a wall member defining the same. The volume of said first compartment is thus constantly diminished and active agent is correspondingly continuously squeezed thereout at an osmotically controlled rate over a prolonged period of time.

In the aforementioned related applications, the disclosures of which are hereby incorporated by reference and are relied upon, there are described and claimed several osmotic active agent dispensers of the immediately above type.

For example, in Higuchi copending application, Ser. No. 106,131 filed Jan. 13, 1971, an osmotic dispenser is comprised of a water permeable housing member, advantageously rigid, confining a first flexible bag of relatively impervious material containing the active agent, advantageously a drug, preferably in a gel, paste or other semi-solid state (albeit a solution or a concentrated solution of active agent will sometimes suffice), and a second bag of controlled permeability to moisture containing a solution of an osmotically effective solute which exhibits an osmotic pressure gradient against water. The said first and second bags are disposed within the said water permeable housing member or porous shell such that water permeates from the environment through the porous shell or housing and migrates by osmosis into the solution contained in the second bag. The solution in the second bag increases in volume, exerting mechanical force on the active agent containing first bag, which mechanical force in turn ejects the active agent out of the apparatus. For purposes of permitting the active agent to be squeezed out of the said first flexible bag, same is provided with any suitable active agent release means or dispensing head to the exterior of the device, e.g., long plastic tubing extending through the porous shell, or ductlike fine tubule connections therethrough.

Higuchi and Leeper copending application, Ser. No. 106,130, filed Jan. 13, 1971, relates to an osmotic dispenser comprised of a first compartment of relatively impervious material containing an active agent and a second compartment containing a solution of an osmotically effective solute which exhibits an osmotic pressure gradient against water. Separating the said first from the said second compartment, and defining a wall member common to each of said compartments, is a sliding or movable barrier of impervious material. The enclosure, whether of integral construction or not, defining the remainder of the second compartment, wherein the osmotic motive force of the dispenser is developed, is at least in part comprised of membrane which exhibits controlled permeability to water. When placed in a hypotonic aqueous environment, water, by osmosis, is absorbed therefrom through the membrane and diffuses into the solution contained in the said second compartment. As the water flows into the second compartment, the solution contained therein increases in volume exerting corresponding pressure behind the movable barrier divider. Such pressure serves to drive the said barrier forward and into the active agent compartment thus diminishing the volume of same, and which sliding barrier in turn ejects the active agent out of the apparatus at an osmotically controlled rate over a prolonged period of time. For purposes of permitting the active agent to be squeezed out of the first compartment, same also is provided with any suitable dispensing head or active agent release means to the exterior of the device, for example, capillary ducts therethrough. A further feature of this invention resides in an osmotic active agent dispenser comprised of a plurality of capsule half shells, similar in shape to pharmaceutical hard gelatin half shells, with a first and a second half shell being securely affixed in capsular configuration, and a third half shell frictionally disposed in such capsule but free to slidably move therein. The said capsule is thereby divided into the two compartments with the third half shell defining the wall member common to each of same.

And Leeper copending application, Ser. No. 106,132, filed Jan. 13, 1971, describes an osmotic dispenser comprised of a first helical compartment of relatively impervious material containing an active agent and a second helical compartment containing a solution of an osmotically effective solute which exhibits an osmotic pressure gradient against water. The two helical compartments are interconnected so as to define a continuous helix. Separating the first helical compartment from the second helical compartment, and defining a wall member common to each of said compartments, is a sliding or movable barrier of impervious material capable of traversing the helix, advantageously a plastic or glass ball separator. The enclosure, whether of integral construction or not, defining the remainder of the second compartment wherein the osmotic motive force of the dispenser is developed, is at least in part comprised of membrane material which exhibits controlled permeability to water. When placed in a hypotonic aqueous environment, water, by osmosis, is absorbed therefrom through the membrane and diffuses into the solution contained in the second compartment. As the water flows into the second compartment, the solution contained therein increases in volume exerting corresponding pressure behind the movable barrier divider. Such pressure serves to drive the said barrier forward and into the active agent compartment thus diminishing the volume of the same, and which sliding or rolling barrier in turn ejects the active agent out of the apparatus at an osmotically controlled rate over a prolonged period of time. For the purpose of permitting the active agent to be squeezed out of the first compartment, the same is provided at its terminal point with any suitable dispensing head or active agent release means to the exterior of the device, for example, a capillary duct therethrough. A further feature of this invention resides in an osmotic active agent dispenser comprised of a dispenser according to the foregoing description enveloped by a relatively rigid, highly permeable housing member. The housing member serves both as a protective means for the dispenser and also to restrict expansion of the dispenser due to internal pressure. Alternatively, such expansion may be in and of itself restricted by means of any suitable band or tie member.

The osmotic active agent dispenser described in Higuchi and Leeper copending application, Ser. No. 106,161, filed Jan. 13, 1971, is comprised of a chamber having controlled permeability to water and containing a solution of an osmotically effective solute which exhibits an osmotic pressure gradient against water, said chamber housing a flexible bag of relatively impervious material containing an active agent and provided with means or dispensing head for releasing said active agent to the exterior of the dispenser. The flexible bag is disposed within the said housing chamber such that as water permeates from the external environment through the permeable walls of the chamber and migrates or diffuses by osmosis into the solution contained therein, same increases in volume thereby generating mechanical compressing or deflating force on the flexible bag, which force in turn ejects the active agent out of the apparatus at an osmotically controlled rate over a prolonged period of time.

The osmotic dispenser proposed in the Rose and Nelson article, supra, too is capable of delivering drug solution at a relatively constant rate. This injector consists of three compartments and a clamp to hold a semipermeable membrane. The motive force of the injector depends on the osmotic pressure developed by a saturated aqueous solution of Congo red against water. This solution is contained in a partially collapsed rubber compartment and is separated from a second water compartment by the semi-permeable cellophane membrane. The partially collapsed bag is placed in a glass ampoule, with the drug compartment of the device being defined by the space between the Congo red bag and the glass ampoule. The ampoule is also provided with drug release means and when the drug compartment is charged with a drug solution water will move by osmosis into the Congo red solution, thus expanding the rubber compartment and providing the mechanical force to eject the drug out of the apparatus.

The compartment or chamber of the aforesaid osmotic active agent dispensers containing the solution of the osmotically effective solute, wherein the osmotic motive force of the respective devices is developed, is at least in part comprised of membrane which exhibits controlled permeability to water. Such membrane can be formed from a wide variety of materials permeable or semi-permeable to solvent (water) but not to solute, i.e., those suitable for the construction of an osmotic cell. Typical membranes are isotropic membranes such as unplasticized cellulose acetate, plasticized cellulose acetate, reinforced cellulose acetate, cellulose di- and triacetate, ethyl cellulose; anisotropic reverse osmosis membranes which typically are made of cellulose acetate; silicone rubbers, polyurethanes, natural rubber, and hydrolyzed ethylene/vinyl acetate copolymers. Isotropic membranes have less water permeability than do the anisotropic membranes. Also, with both types of membranes, increasing the acetate content of the cellulose acetate polymer decreases the water permeability. In devices, the surface areas of the membranes of which are relatively limited, it will be preferred to use semi-permeable membranes allowing relatively rapid water transmission. Thus, in such embodiments the anisotropic membranes are the preferred. For drug depot applications as heretofore described, the membranes are also biologically inert, non-irritating to body tissues and non-allergenic. So too in such applications are the other materials from which the topic dispensers are fabricated.

For best results, the membrane should be substantially impermeable to passage of the osmotically effective solute so as to prevent loss thereof. However, those solutions of osmotically effective solutes which exhibit an osmotic pressure gradient against water and which heretofore have been employed do not fully resist penetration through the water permeable membranes confining the same.

SUMMARY OF THE INVENTION

Accordingly, it is a primary object of this invention to provide an osmotic dispenser, simple in construction, which exhibits all of the practical benefits of long-term continuous administration of various active agents both to animals, humans, and into other environments.

Another object of this invention is to provide an improved osmotic dispenser which overcomes problems inherent in related devices heretofore proposed.

In attaining the objects of this invention, one feature resides in an osmotic active agent dispenser, the motive force of which is developed by a solution of an osmotically effective solute which exhibits an osmotic pressure gradient against water, and which solute resists penetration through the controlledly water permeable membrane confining the same.

Other objects, features and advantages of this invention will become more apparent from the following description.

DETAILED DESCRIPTION OF THE INVENTION

In accordance with this invention, it has been discovered that the use of magnesium sulphate as the osmotically effective solute provides not only an effective hypertonic solution which exhibits an osmotic pressure gradient against water, suitable for use in the aforedescribed osmotic dispensers, but also a hypertonic solution, the magnesium sulphate solute of which essentially wholly resists penetration through the water permeable membrane confining the same.

Magnesium sulphate exists in the contemplated hypertonic solutions in a heptahydrate form, $MgSO_4 \cdot 7H_2O$. It will not diffuse through or penetrate membranes of the type discussed above. It is also non-toxic which is important in pharmaceutical applications of the devices.

Hypertonic solutions and saturated solutions of magnesium sulphate are therefore desirable for use in osmotic dispensers. Said solutions are most preferably saturated aqueous solutions. To maintain the solutions saturated and hence to achieve a constant osmotic pressure throughout operation of the respective dispensers, the compartments containing the solutions also contain excess magnesium sulphate in solid form. The excess solute maintains the solutions saturated even after water diffuses into those chambers of the devices.

In an especially preferred embodiment of the invention, the initial solution is an aqueous solution saturated with magnesium chloride and containing excess magnesium sulphate solute in solid form.

To further illustrate the present invention and the advantages thereof, the following specific examples are given, it being understood that same are intended merely as illustrative and in no wise limitative.

EXAMPLE 1

Figure 2:
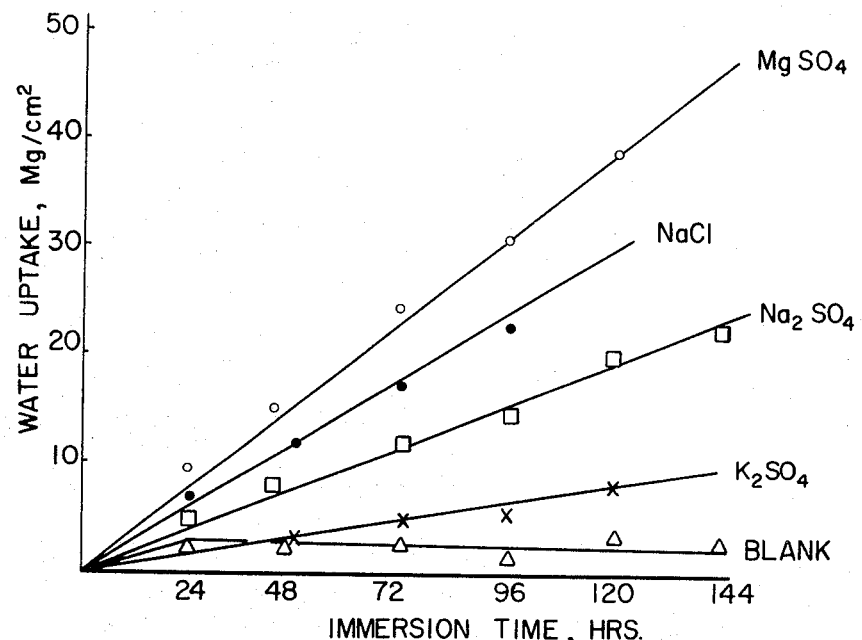
FIG. 2 is a graphical representation of the relationship between water uptake into an osmotic device and immersion time, presenting data for several osmotically effective solutes.

A device constructed in accordance with FIG. 2 of Higuchi and Leeper application, Ser. No. 106,130, filed Jan. 13, 1971, and fitted with a 3 mils thick unplasticized isotropic cellulose acetate membrane, having an acetate substitution of 2.4, passes water at the rate of 70 mg/cm$^2$ per day against a saturated magnesium sulphate solution at 39° C. An aliquot taken from the aqueous environment in which the device is placed (tap water), after about 4 hours of dispenser operation, and analyzed for magnesium sulphate content, reveals that essentially none of this solute had penetrated through the membrane. The environment was then analyzed for magnesium sulphate content by means of electrical conductivity measurement. The conductivity of the said environment confirmed that essentially no solute had penetrated the membrane.

EXAMPLES 2 & 3

Figure 1:
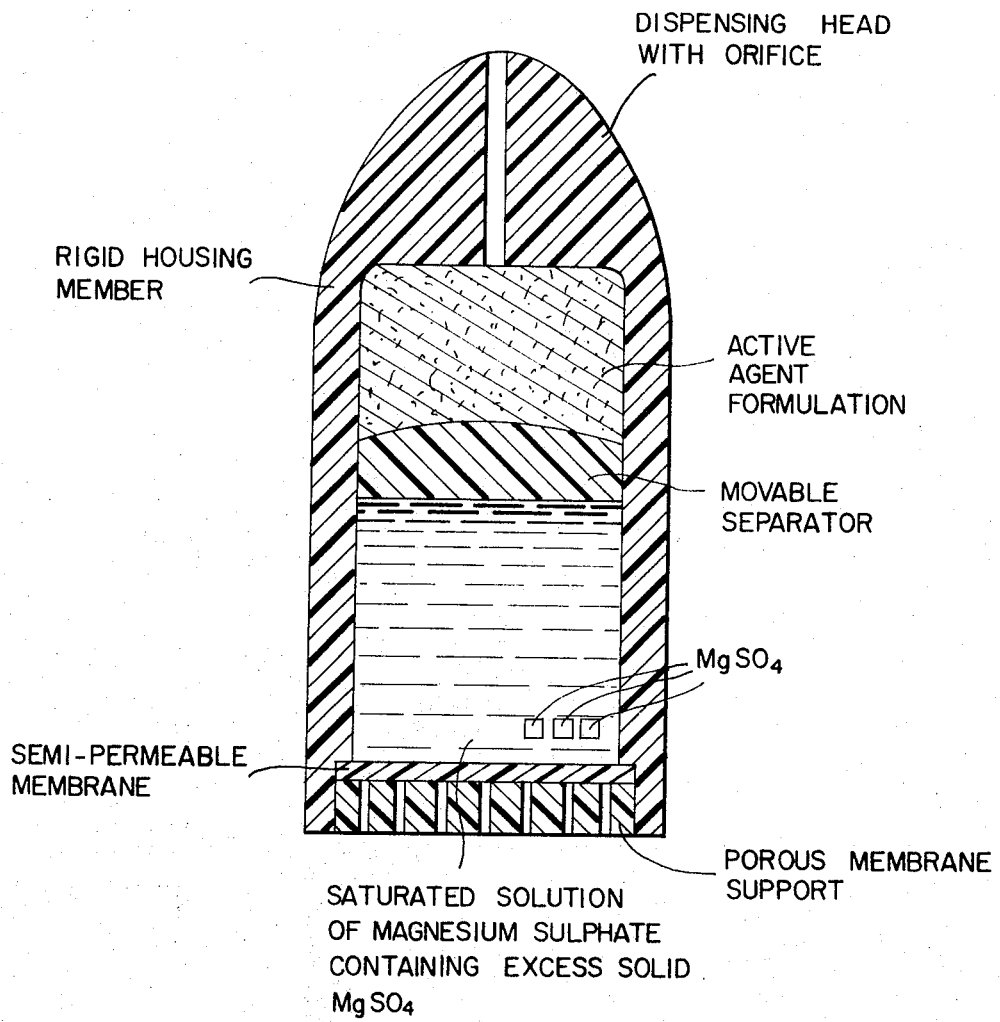
FIG. 1 is a longitudinal cross-sectional view of an osmotic in accordance with the present invention.
Figure 3:
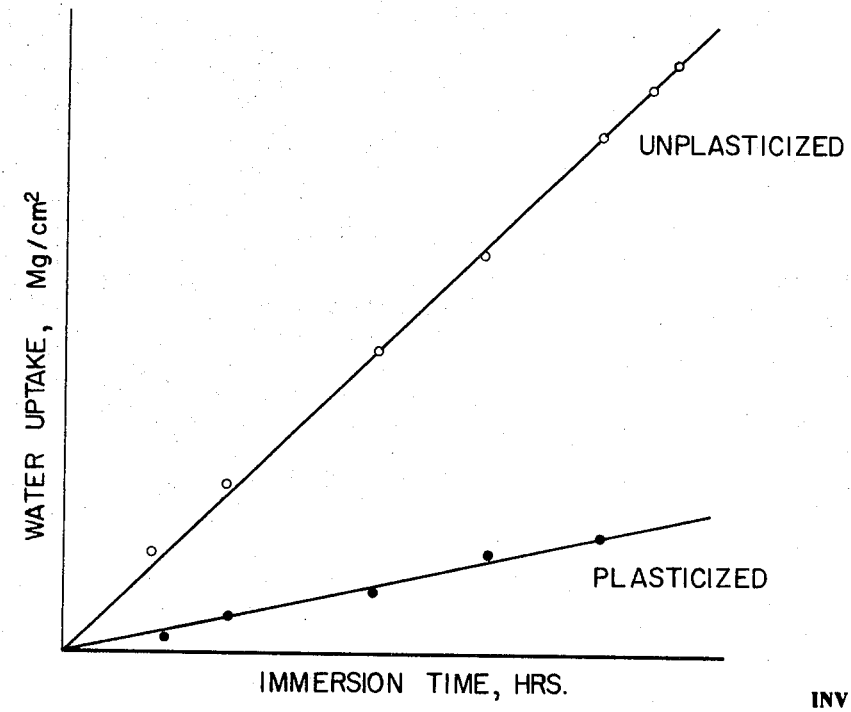
FIG. 3 is a graphic representation of the relationship of water uptake into an osmotic device and immersion time for a plasticized and unplasticized membrane.

Two devices were constructed exactly as in Example 1, except that the designs were those of FIGS. 1 and 3, respectively, of Higuchi application, Ser. No. 106,131, filed Jan. 13, 1971. Aliquots were again taken and analyzed as in the Example 1, and the results of such analyses were identical to those of the previous example.

EXAMPLE 4

A device was constructed in accordance with FIG. 1 of Higuchi and Leeper application, Ser. No. 106,130, filed Jan. 13, 1971, and fitted with an anisotropic cellulose acetate membrane (Eastman Chemical Products Type RO 97). This dispenser is permeable to 7.5 to 10 cc/cm$^2$/day of water, at atmospheric pressure, and, when fabricated from polymethylmethacrylate dispensing head, separator, and tubing having an inner diameter of 1.9 cm, is capable of delivering 4 to 6 cc of active agent, advantageously a drug, per day. No magnesium sulphate is found in an aliquot taken as in the previous examples. In FIG. 1 there is illustrated the device of this example.

EXAMPLE 5

A device is constructed exactly as in Example 1, except that it was fitted with a membrane 1.5 mils thick and the solution was an aqueous solution saturated with magnesium chloride and containing excess magnesium sulphate solute in solid form. Water was passed at the rat of 146 mg/cm$^2$ per day against this solution at 39° C. The results of analyses as in the previous examples indicated that essentially no solute had penetrated through the membrane.

Surprisingly, it has moreover also been ascertained that not only does the solute of the topic solutions resist penetration through the water permeable membranes confining the same, but in addition the uptake of water into a dispenser according to the invention is markedly enhanced, or, stated differently, the membranes exhibit a greater degree of permeability against solutions comprised of magnesium sulphate solute. In FIG. 2 are shown the result of an experiment utilizing a variety of solutions of osmotically effective solutes and wherein immersion time is plotted against water uptake. It can thus readily be seen that permeability is greatest against the magnesium sulphate solution. For purposes of this experiment five envelopes approximately 2 inches square were prepared from 10 mils thick plasticized cellulose acetate film (Eastman Chemical Products "Tenite" brand). These envelopes were next filled with given amounts of the respective solutions and sufficient excess solute in solid form was added to each to maintain the respective solutions saturated for the duration of the experiment. The envelopes were then heat sealed and immersed in distilled water for a period of 144 hours. Water uptake was from time to time determined, as indicated, by subtracting initial volume from that existing at experiment's end, dividing this value into the available surface area of each envelope whereat diffusion takes place, approximately 35 cm$^2$, and converting as to weight. Since the permeability of water through a given membrane is much lower when the membrane is plasticized, the aforesaid experiment was repeated, with the envelopes again being prepared from the 10 mils thick "Tenite" cellulose acetate film, but in this instance with the plasticizer being ether extracted therefrom. The relative water uptakes of the plasticized film versus the plasticizer-removed film are shown in FIG. 3. It will also be appreciated that whereas the envelopes employed for the experiment of FIG. 2 can conveniently be prepared by simple heat sealing of two squares of the plasticized membrane, such is not the case with respect to the envelopes employed for the experiment of FIG. 3. Unplasticized membranes are only difficulty heat sealed. Therefore, for the FIG. 3 experiment the envelopes were prepared by adhesively bonding the squares of cellulose acetate with a solution of cellulose acetate in acetone, 20 percent concentration.

The osmotic dispenser can be fabricated in any convenient shape for either physical insertion or implantation in the body, or for administration via the gastrointestinal tract, or for introduction into any desired aqueous environment. Dimensions of the device can thus vary widely and are not of controlling importance. The lower limit of the size of the device is governed by the amount of the particular active agent to be supplied to the aqueous environment to elicit the desired response, as well as by the form the dosage unit takes, for example, in cases of specific body uses, implantate, bolus, IUD, IVD, vaginal ring, uterine capsule for fertility suppression, artificial gland, pessary, prosthesis, suppository, and the like.

Thus, the invention provides, in an osmotic dispenser, a reliable means for releasing effective concentrations of active agent contained therein to the body of a living organism, or to any other environment, at an osmotically controlled rate and over a prolonged period of time. In addition, prime advantages of the dispenser of the invention are that water uptake is enhanced and that it resists loss of its osmotically effective solute to a working environment.

While the invention has been described and illustrated with reference to certain preferred embodiments thereof, those skilled in the art will appreciate that various modifications, changes, omissions, and substitutions can be made without departing from the spirit of the invention. It is intended, therefore, that the invention be limited only by the scope of the following claims.

What is claimed is:

1. In an osmotic active agent dispenser comprised of a first compartment of relatively impervious material containing an active agent and provided with means for releasing the active agent to the exterior of the dispenser, and a second compartment of controlled permeability to water containing a solution of an osmotically effective solute which exhibits an osmotic pressure gradient against water, the said first and second compartments being so constructed that the said first diminishes in volume in response to an increase in volume of the solution in the said second via absorption of water therein, whereby as water flows into the dispenser in a tendency towards osmotic equilibrium with its environment, active agent is continuously squeezed thereout at an osmotically controlled rate over a prolonged period of time; the improvement which comprises, as the solution of an osmotically effective solute in the said second compartment, a solution of magnesium sulphate exhibiting an osmotic pressure gradient against water.

2. The osmotic dispenser as defined by claim 1, wherein the solution of magnesium sulphate is a saturated aqueous solution.

3. The osmotic dispenser as defined by claim 2, wherein the solution contains excess magnesium sulphate solute in solid form.

4. The osmotic dispenser as defined by claim 1, wherein the active agent is selected from the group consisting of a drug and a bio-affecting composition.

5. In an osmotic active agent dispenser comprised of a first compartment of relatively impervious material containing an active agent and provided with means for releasing the active agent to the exterior of the dispenser, and a second compartment of controlled permeability to water containing a solution of an osmotically effective solute which exhibits an osmotic pressure gradient against water, the said first and second compartments being so constructed that the said first diminishes in volume in response to an increase in volume of the solution in the said second via absorption of water therein, whereby as water flows into the dispenser in a tendency towards osmotic equilibrium with its environment, active agent is continuously squeezed thereout at an osmotically controlled rate over a prolonged period of time the improvement which comprises, as the solution of an osmotically effective solute in the said second compartment, a solution of magnesium chloride containing excess magnesium sulphate solute in solid form exhibiting an osmotic pressure gradient against water.

6. The osmotic dispenser as defined by claim 5, wherein the solution is a saturated aqueous solution.

7. The osmotic dispenser as defined by claim 5, wherein the active agent is selected from the group consisting of a drug and a bio-affecting composition.

* * * * *